US006738377B1

(12) United States Patent
Boden (10) Patent No.: US 6,738,377 B1
(45) Date of Patent: May 18, 2004

(54) SYSTEM AND METHOD FOR DYNAMIC MICRO PLACEMENT OF IP CONNECTION FILTERS

(75) Inventor: Edward B. Boden, Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/239,694

(22) Filed: Jan. 29, 1999

(51) Int. Cl.[7] ............................................. H04L 12/28
(52) U.S. Cl. ...................... 370/392; 370/352; 370/389; 370/395.53; 370/497
(58) Field of Search ................................ 370/238, 351, 370/354, 389, 392, 395.52, 401, 356, 360, 386, 395.53, 488, 497; 704/1, 243, 244; 709/222, 225; 713/160, 165, 168

(56) References Cited

U.S. PATENT DOCUMENTS

| | | | |
|---|---|---|---|
| 5,606,668 A | 2/1997 | Shwed | 395/200.11 |
| 5,640,399 A | 6/1997 | Rostoker et al. | 370/392 |
| 5,648,965 A | 7/1997 | Thadani et al. | 370/241 |
| 5,668,809 A | 9/1997 | Rostoker et al. | 370/392 |
| 5,757,924 A | 5/1998 | Friedman et al. | 380/49 |
| 5,802,278 A | 9/1998 | Isfeld et al. | 395/200.02 |
| 5,805,572 A | 9/1998 | Bernabeu-Auban et al. | 370/255 |
| 5,828,833 A | 10/1998 | Belville et al. | 395/187.01 |
| 5,835,727 A | 11/1998 | Wong et al. | 395/200.68 |
| 5,848,233 A | 12/1998 | Radia et al. | 395/187.01 |
| 6,144,934 A * | 11/2000 | Stockwell et al. | 704/1 |
| 6,230,271 B1 * | 5/2001 | Wadlow et al. | 713/201 |
| 6,253,321 B1 * | 6/2001 | Nikander et al. | 713/160 |
| 6,330,562 B1 * | 12/2001 | Boden et al. | 707/10 |
| 6,341,130 B1 * | 1/2002 | Lakshman et al. | 370/389 |
| 6,397,330 B1 * | 5/2002 | Elgamal et al. | 713/164 |
| 6,449,256 B1 * | 9/2002 | Varghese et al. | 370/238 |
| 6,502,135 B1 * | 12/2002 | Munger et al. | 709/225 |

FOREIGN PATENT DOCUMENTS

| | | | |
|---|---|---|---|
| JP | 05-120340 | 5/1993 | G06F/15/40 |
| JP | 2001-167125 | 6/2001 | G06F/17/30 |
| WO | WO98/26555 | 6/1998 | H04L/29/06 |

OTHER PUBLICATIONS

Technical Report of IEICE, IN96–144 "A Study on An Automatic Generation and Recovery System . . . ".
RFC 2401 Security Architecture for the Internet Protocol.
Technical Report of IEICE, IN98–119 "A 50 Mpps Longest Prefix Match Search Engine LSI . . . ".
Recent Object Orientation Technology '98, pp. 124–132 "Firewall Gateway Software Architecture and Framework".
"Design for a Simple network Management Protocol Subagent for Internet Firewalls", IBM Technical Disclosure Bulletin, v.40, n.03, Mar. 1997 pp. 63–68.

* cited by examiner

Primary Examiner—Phirin Sam
(74) Attorney, Agent, or Firm—Shelley M. Beckstrand (57) ABSTRACT

Virtual Private Networking (VPN) is an emerging technology area enabling e-business on the Internet. A key underlying VPN technology is IP Security (IPsec), for providing private (encrypted and authenticated) secure data transmission over public (Internet) networks. The definition of what data to protect ultimately results in IP filter rules, loaded to the operating system kernel. These are used to select the correct IP datagrams and cause each to be processed by the correct IPsec Security Associations. Connection filters which are used to implement VPN connections are dynamic, and must be inserted and deleted within the currently installed set of IP filters (non-VPN related). IP filter order is crucial to proper functioning. Micro filter placement employees filter collision detection and eliminates order Aependeney collisions among a set of connection filters.

14 Claims, 2 Drawing Sheets

SYSTEM AND METHOD FOR DYNAMIC MICRO PLACEMENT OF IP CONNECTION FILTERS

CROSS REFERENCES TO RELATED APPLICATIONS

U.S. patent applications Ser. No. 09/239,693, now U.S. Pat. No. 6,330,562, entitled System and Method for Managing Security Objects, Ser. No. 09/240,720, entitled "System and Method for Network Address Translation Integration With IP Security", Ser. No. 09/240,482, entitled "System and Method for Communicating Client IP Addresses to Server Applications", Ser. No. 09/240,718, entitled "System and Method for Dynamic Macro Placement of IP Connection Filters", and Ser. No. 09/240,483, entitled "System and Method for Central Management of Connections in a Virtual Private Network, filed concurrently herewith are assigned to the same assignee hereof and contain subject matter related, in certain respects, to the subject matter of the present application. The above-identified patent applications are incorporated herein by reference.

BACKGROUND OF THE INVENTION

1. Technical Field of the Invention

This invention pertains to virtual private network (VPN) implementations, a fundamental enabler for E-business. More particularly, it relates to detecting filter collision to effect micro filter placement.

2. Background Art

Virtual Private Network (VPN) is a fundamental enabler for electronic business. IP Security, the technology VPNs are built upon, provides data encryption and authentication at the IP datagram level of TCP/IP.

A policy filter is a type of filter used to mark the place, in a larger set of filters, where a particular data protection policy is to be effected. When a new filter rule (also referred to as SPD entry) is added to a set of existing filter rules, as distinguished from replacing the entire set, the question is, where to put it? Where, relative to the other entries? This is important, since filter rules are logically processed top-to-bottom and particular IP packet may easily match more than one rule. This becomes even more important in the context of security policy decisions, which is what each connection filter rule represents. In accordance with current requirements, to ensure consistent, predictable processing, SPD entries must be ordered and the SPD must always be searched in the same order, so that the first matching entry is consistently selected. This requirement is necessary as the effect of processing traffic against SPD entries must be deterministic, but there is no way to canonicalize SPD entries.

If all the SPD entries were fairly static, a solution is to present the list of SPD entries in some suitable form to the user, who would then order it, then re-load the new ordering. Aside from the perhaps unappealing mechanics, the problem with this is that the SPD entries are not static. Both initiator and responder-mode connections require dynamically loading new connection filters. It is, therefore, not practical to expect the user to order these filters dynamically. Another approach would be to have the user specify an a priori ordering for connections started locally (say, auto-started or scheduled). The problem with this is that it adds yet another level of complexity to the already complex VPN configuration process, and does not work for responder-mode connections without even additional configuration complexity and perhaps unnecessary restrictions on responder-mode connections.

IP filter rules are processed top-to-bottom, in the order given by the user. IP security introduces a new level of complexity, because the filter rules now have to be placed in the right position dynamically by the system, since IP Security connections are dynamic. These filter rules also have to be removed dynamically. The IP Security Architecture (Internet RFC2401, and other IP Sec RFC's) provides no guidance on how to implement these capabilities. There is, therefore, a need in the art for a system and method which gives the user direct and simple control over how its IP Security policy is enforced without requiring it to order the filter rules for each IP Security connection.

It is an object of the invention to provide an improved system and method for managing a set of filter rules associated with VPN connections.

It is a further object of the invention to provide a system and method for dynamically loading individual connection filters in a preexisting set of connection filters.

It is a further object of the invention to provide a system and method providing deterministic and unambiguous VPN connections, in a completely automated manner, that meet the customer-specified data protection policy.

It is a further object of the invention to provide a system and method of providing automated assurance that all VPN connections for a given data protection policy, actually cause data to be protected as per the policy.

It is a further object of the invention to provide for micro placement of connection filters.

SUMMARY OF THE INVENTION

In accordance with the invention, a system and method are provided for implementing an IP security policy by manually specifying the order of policy filters and thereafter automatically generating connection filters and placing them in the list of all IP filters relative to the appropriate policy filter, and relative to other existing connection filters for that policy.

Other features and advantages of this invention will become apparent from the following detailed description of the presently preferred embodiment of the invention, taken in conjunction with the accompanying drawings.

BEST MODE FOR CARRYING OUT THE INVENTION

Virtual Private Networking (VPN) is an emerging technology area enabling e-business on the Internet, being delivered in the IBM AS/400. A key underlying VPN technology is IP Security (IPsec), a means of providing private (encrypted and authenticated) secure data transmission over public (Internet) networks. IPsec is an Internet Engineering Task Force (IETF) standards-track protocol (see RFC 2401, IP Security Architecture). Basic to VPN utilization are the customer-specified data protection policies. For the preferred embodiment of the invention on the IBM AS/400, this VPN policy database defines the kinds of network data to protect, and the details of how the customer wants them protected.

The definition of what data to protect ultimately results in IP filter rules, loaded to the IBM OS/400 kernel. These are used to select the correct IP datagrams and cause each to be processed by the correct IPsec Security Associations (SAs, see RFC 2401). VPN on the AS/400 provides the valuable concept of a VPN connection, which is the active, operational use of a previously defined VPN policy. Along with other attributes, a VPN connection can be started, stopped, and can be monitored (via the AS/400 Operations Navigator GUI). So, the connection filters which are used to implement VPN connections are dynamic. They must be inserted and deleted within the currently installed set of IP filters (non-VPN related). Since IP filter order is crucial to proper functioning, the basic problem is, where to place these dynamic filters? This filter placement problem as a macro and a micro part. In accordance with the present invention, filter collision detection is used to solve the micro placement problem: where to place a new connection filter among an existing set of connection filters for the same policy. It is important to have a completely automated solution, one that requires no additional configuration information from the user, due to the high frequency of connection filter insertion and deletion. The macro placement problem is solved in copending patent application, Ser. No. 09/240,718.

Figure 1:
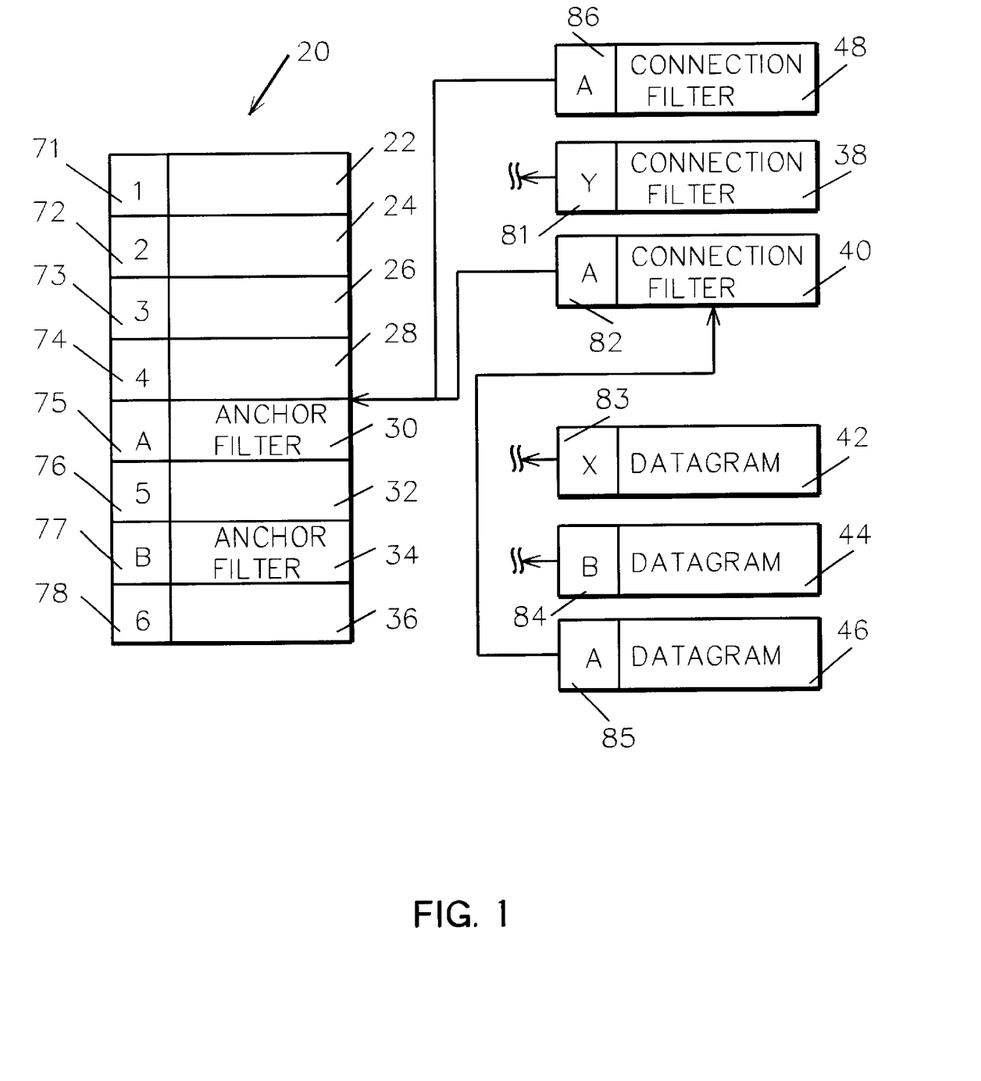
FIG. 1 illustrates macro placement of policy filters and processing of datagrams.

Referring to FIG. 1, as is more fully described in copending patent application, Ser. No. 09/240.718, an IPsec user defines a set 20 of filter rules 22–36 which includes within the set an anchor filter 30, which is also known as a policy filter. This set 20 is loaded. In accordance with the preferred embodiment of the invention, VPN connections 38, 40 (also referred to as IPsec connections) are dynamically placed within the loaded (preexisting) set 20 of filter rules as follows. In order to assure that IP traffic that should be protected through some VPN connection does not leave the system unprotected, the name 81 associated with the connection filter 38 is checked in order through the set 20 of filters. If a policy filter is not found with a matching name (which in this case, it does not), the VPN connection 38 fails to load. If, as is the case with name 82 of connection filter 40, a anchor filter 30 is found with a matching name 75, then the VPN connection filter 40 is inserted in the list 20 of rules immediately before this anchor filter 30. The macro placement objective is thus achieved: this connection filter 40 is placed in its proper place in the set 20.

By employing filter collision detection, the micro placement problem is solved by eliminating ordering dependencies among a set of connection filters. Two filters are said to collide (or overlap), if the filter rule that matches an IP datagram depends on the order of the two filter rules, for all possible valid IP datagrams. If collisions are eliminated, then filters can be placed in any order. Hence, the micro placement problem is solved, because the new filter rule may be placed anywhere that is convenient, among the existing filters.

The method of the preferred embodiment of the invention for micro placement of filter rules is executed during VPN connection start-up, and not during the processing of IP datagrams for a VPN connection.

In accordance with the preferred embodiment of the invention, a system and method is provided whereby a user need only specify the order of the policy filters. Subsequently, system generated connection filters are automatically placed in the list of all IP filters, relative to the appropriate policy filter. In this manner, the user is provided a simple and clear manner in which to configure a Virtual Private Network on, for example, the IBM AS/400 system.

In accordance with the preferred embodiment of the invention, the following elements characterize an IP filter rule list, or VPN.

1. A connection definition exists with the property that each connection definition has one and only one phase 2 policy. Thus, any number of connections can be started based on a single connection definition.
2. An n-to-1 correspondence exists between a connection definition and a filter rule (the anchor filter). A deferred selector allows multiple connection definitions per anchor filter for external connections via a user identifier.
3. Anchor filters have an n-to-1 correspondence to a physical interface. That is, each anchor filter may be applied to multiple physical interfaces, but only zero or one times each.
4. Anchor filters are loaded completely automatically when an interface starts. In other words, if an anchor filter is defined for an interface, the interface cannot start unless the anchor filter is loaded. This enables a mechanism for enforcing a user's IP security policy. An interface is IP Sec enabled if, and only if, it has at least one anchor filter.
5. Anchor filters are explicitly ordered by the user. In so doing, the order in which connections for each connection definition are to be processed is defined, hence the order in which policies are to be applied.
6. If during the filter processing (all filter types, logically top-to-bottom), a packet is matched by an anchor filter, the packet is discarded. Anchor filters are identifiable in SLIC because the connection definition value (SPD entry) they specify is the connection definition itself because the name has sequence number 0. In other words, because the IP packet fails to match a prior existing connection, the policy is enforced and the packet is discarded.
7. Detecting and handling connection filter collisions is provided.
8. When a connection filter is loaded, the filter placement process is includes two parts: macro placement in context of all filter rules for an interface, and micro placement. With respect to macro placement, the connection filter is placed logically before its matching anchor filter and after any other anchor filters which proceed the matching anchor filter. The matching of anchor to connection is done using the connection name.

Micro placement within connections already started for the connection definition occurs as follows. If no collision is detected, the filter rule is placed anywhere. Otherwise, if the collision was on a source or destination IP address and the collision filter has a subnet mask, then the new filter is placed before the collision filter, meaning that the new connection filter is more specific. (This special case connection filter overlap is allowed due to its utility in VPN connection definitions.)

In this manner, filter placement is executed. The user specifies the ordering of policy while the system frees the user from having to order every specific filter rule and protects him from arbitrary (non-deterministic) policy enforcement. If too many connections fail due to collisions, a new connection definition and associated anchor may be created, and that new anchor ordered with respect to existing anchors.

Figure 2:
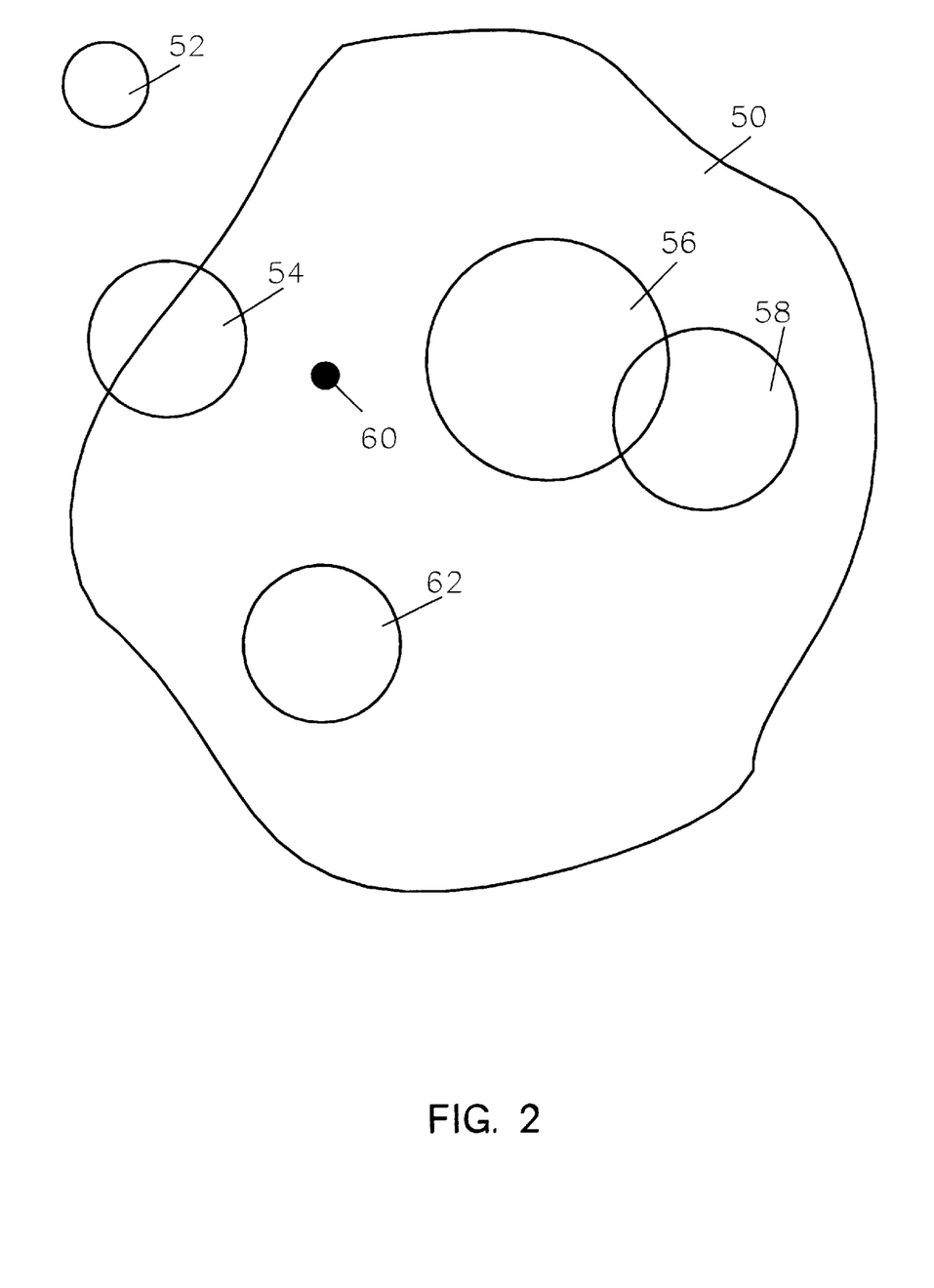
FIG. 2 illustrates collision detection in accordance with the preferred embodiment of the invention for solving the micro placement problem.

Referring to the diagram of FIG. 2, in accordance with the preferred embodiment of the invention, filter collision detection is executed by first determining if this connection filter 58 overlaps or is in collision with any existing connection filter 56 for this policy filter 50. If there is a collision, which is the case for connection filter 58 with existing connection filter 56, this connection filter 58 does not load. If there is no collision with any existing connection filter for this policy filter, which is the case for connection filter 62, then this connection filter 62 can be placed or inserted anywhere in the group of connection filters 56, 60 previously associated with this policy filter 50, and the micro objective is achieved. Thus, a user may define a number of connections for a policy that don't overlap with each other, and they will all be loaded. The user may define a connection filter that completely matches a policy filter, and that connection filter will be the only one loaded for that policy filter (not a normal case). Also, a user may define a plurality of connection filters 56, 58 for a given policy filter which overlap. In accordance with the invention, the user is protected against such ambiguities (partially matching connection filters) by not allowing a second connection filter 58 to be loaded which overlaps with a first, previously loaded, connection filter 56. Such connection filters 56, 58 are handled first come first served.

Referring again to FIG. 2, two filter rules 56, 58 overlap, or collide, if IP traffic will be routed differently depending upon the order of the two rules. Overlapping of filter rules is determined by detecting first order and second order collision. First order collision may occur when two filter rules have at least one selector not in common. First order collision detection is illustrated in Table 8. Second order collision may occur when two filter rules, which do not exhibit first order collision, only have selectors in common; in this case, the test is whether these common selectors collide. Second order collision detection is represented in Tables 9 and 10. IP datagrams are selected for IPsec based on data in the datagram. There are five pieces of such data in the IP header, called selectors by the IPsec architecture (RFC2401). These selectors are source ip address, destination ip address, source port, destination port, and protocol.

A requirement of IP Sec architecture is that for each selector, a policy entry specifies how to derive the corresponding values for a new Security Association Database entry from those in the SPD and the packet. Ranges are supported for IP addresses, but wildcarding can be expressed for all selectors by using the value in the packet itself or using the value associated with the policy entry. In accordance with the preferred embodiment of the invention, this requirement is met through the use of the connection definition and connection concepts. It is in the connection definition that the user specifies how to derive selector values for a particular connection generated from this connection definition. The connection granularity can be specified separately for each selector as one of a number of values.

Further in accordance with a preferred embodiment of the invention, when a connection filter is loaded the following audits are performed:

1. During the processing to load any connection filter, whether or not the traffic defined by the new connection filter overlaps the traffic defined by any existing connection for the same connection definition will be determined. In so doing, nested subnets are not counted as collisions. If a collision is found, the connection will fail with an appropriate return code to the connection manager.
2. An anchor filter must exist for each interface for which a connection filter is being loaded. If not, an appropriate return code is generated.
3. An anchor filter cannot be loaded twice for a given interface.

Table 1 shows the selector granularity values specified in a connection definition and used in the scenarios described hereafter. The value 's' corresponds to use of the value in the packet itself, and the values [f,s,c] correspond to values associated with the policy entry.

TABLE 1

SELECTOR GRANULARITY VALUES

| | |
|---|---|
| f | obtain connection selector from policy filter (exactly) |
| s | use a single (scaler) value from the IDci or IDcr or an ID (local or remote) in a 'user client pair'. The scalar value must be within the set of values specified for this selector, as determined by the policy filter (aka anchor filter). |
| c | use the ID exactly. If external, it is IDci or IDcr. If 'user' initialization, it is the value of an ID in the client pair (local or remote, as appropriate). (Not a valid value for on-demand initialization types.) |

The use of these values is illustrated in Table 2, in which the columns correspond to the start modes of connections. This is what the user (logically) completes as a connection definition is created. 'Selector value' and 'selector granularity value' refer to different things in the following tables. User connection start modes may be manual, auto, or scheduled.

TABLE 2

USE OF SELECTOR GRANULARITY VALUES

| | CONNECTION START MODES | | |
|---|---|---|---|
| SELECTORS | USER | EXTERNAL | ON-DEMAND |
| source ip addr | f, c or s | f, c or s | f or s |
| dest ip addr | f, c or s | f, c or s | f or s |
| source port | f, c or s | f, c or s | f or s |
| dest port | f, c or s | f, c or s | f or s |
| protocol | f, c or s | f, c or s | f or s |

With reference to Table 2:
1. For on-demand, if 'c' is allowed, it will have the same meaning as 's'.
2. Selector granularity values may be specified independently for each selector, in any column.
3. Selector granularity values must be consistent with the connection definition endpoint rules (both local and remote). So, if the local endpoint rule is host, then the granularity values for source ip address and source port selectors must be 's' or 'f'. And if 'f', then the connection definition filter must have scalar values for source ip address and source port. And, if the remote endpoint rule is host, then the granularity values for destination ip address and destination port must be 's' or 'f'. And if 'f', then the connection definition filter must have scalar values for destination ip address and destination port.
4. When user client pairs are defined, values for each column are audited to ensure a) they are within the selector values defined in the connection definition filter, and b) they are in agreement with the selector granularity values for the connection definition. For example, if destination ip in the connection filter is u.v.w.*, a user client pair may not have u.v.*.* for remote client ID. And if the destination ip granularity is 's', the user client pair must have a single ip address for the destination ip of the remote data endpoint.
5. When a connection definition is created that has a static data management policy, user client pairs must be defined and all the selector granularity values default to 'c'.

Referring to Tables 3–6, various scanners illustrate logical views of how anchor and connection filters are used, based on connection definition specifics.

In Table 3, the use of selector granularity values of all 'f' is illustrated. This has the direct consequence that only a single connection may be started for this connection.

TABLE 3 connection def name = boston1,
initialization = user, roles = gw to gw.

| event | | src ip | dest ip | src port | dest port | proto | connection |
|---|---|---|---|---|---|---|---|
| anchor filter | | a.b.c.* | x.y.z.* | * | * | * | |
| selector granularity | | f | f | f | f | f | |
| client pair | | (n/a or none defined) | | | | | |
| after ifc | 0 | a.b.c.* | x.y.z.* | * | * | * | boston1:L0 |
| start | i | x.y.z.* | a.b.c.* | * | * | * | boston1:L0 |
| after conn | 0 | a.b.c.* | x.y.z.* | * | * | * | boston1:L1 |
| start | 0 | a.b.c.* | x.y.z.* | * | * | * | boston1:L0 |
| | i | x.y.z.* | a.b.c.* | * | * | * | boston1:L1 |
| | i | x.y.z.* | a.b.c.* | * | * | * | boston1:L0 |

Referring to Table 4, 's' values are illustrated for source and destination IP address. In this scenario, client pairs must be within policy filter (this is always true, for any client pairs defined), only connections defined by some client pair can be started (due to the 's' values).

TABLE 4 connection def name = susan,
initialization = user, roles = gw to gw.

| event | | src ip | dest ip | src port | dest port | proto | connection |
|---|---|---|---|---|---|---|---|
| anchor filter | | a.b.c.* | x.y.z.* | * | * | * | |
| selector granularity | | s | s | f | f | f | |
| client pair 1 | | a.b.c.1 | x.y.z.10 | * | * | * | |
| client pair 2 | | a.b.c.2 | x.y.z.11 | * | * | * | |
| after ifc | 0 | a.b.c.* | x.y.z.* | * | * | * | susan:L0 |
| start | i | x.y.z.* | a.b.c.* | * | * | * | susan:L0 |
| after conn | 0 | a.b.c.2 | x.y.z.11 | * | * | * | susan:R11 |
| start | 0 | a.b.c.* | x.y.z.* | * | * | * | susan:L0 |
| (cp2) | i | x.y.z.11 | a.b.c.2 | * | * | * | susan:L11 |
| | i | x.y.z.* | a.b.c.* | * | * | * | susan:L0 |

TABLE 4-continued connection def name = susan,
initialization = user, roles = gw to gw.

| event | | src ip | dest ip | src port | dest port | proto | connection |
|---|---|---|---|---|---|---|---|
| after conn | 0 | a.b.c.1 | x.y.z.10 | * | * | * | susan:L23 |
| start | 0 | a.b.c.2 | x.y.z.11 | * | * | * | susan:L11 |
| (cp1) | 0 | a.b.c.* | x.y.z.* | * | * | * | susan:L0 |
| | i | x.y.z.11 | a.b.c.2 | * | * | * | susan:L11 |
| | i | x.y.z.10 | a.b.c.1 | * | * | * | susan:L23 |
| | i | x.y.z.* | a.b.c.* | * | * | * | susan:L0 |

Referring to Table 5, showing an external scenario, before any phase 2 and connection load, all traffic that matches the anchor filter is discarded, as is always the case, before ipsec connection is started. Further, any phase2 IDcr, IDci negotiated by IKE must be within the policy filter selector values; a new connection is allowed if it does not collide with any existing connection; and maximum connections are allowed, due to connection def filter being 255, unless IDcr, IDci include specific port values. ("htt" in the connection def name may be read "heretothere".)

TABLE 5 connection def name = htt,
initialization = external, roles = gw to gw.

| event | | src ip | dest ip | src port | dest port | proto | connection |
|---|---|---|---|---|---|---|---|
| anchor filter | | a.b.c.* | x.y.z.* | * | * | * | |
| selector granularity | | s | s | s | s | f | |
| client pair 1 | | (none allowed) | | | | | |
| after ifc | 0 | a.b.c.* | x.y.z.* | * | * | * | htt:L0 |
| start | i | x.y.z.* | a.b.c.* | * | * | * | htt:L0 |
| after conn | 0 | a.b.c.5 | x.y.z.15 | 21 | 21 | * | htt:L301 |
| start | 0 | a.b.c.* | x.y.z.* | * | * | * | htt:L0 |
| | i | x.y.z.15 | a.b.c.5 | 21 | 21 | * | htt:L301 |
| | i | x.y.z.* | a.b.c.* | * | * | * | htt:L0 |
| after conn | 0 | a.b.c.5 | x.y.z.15 | 21 | 21 | * | htt:L301 |
| start | 0 | a.b.c.7 | x.y.z.17 | 20 | 20 | * | htt:L320 |
| | 0 | a.b.c.* | x.y.z.* | * | * | * | htt:L0 |
| | i | x.y.z.17 | a.b.c.7 | 20 | 20 | * | htt:L320 |
| | i | x.y.z.15 | a.b.c.5 | 21 | 21 | * | htt:L301 |
| | i | x.y.z.* | a.b.c.* | * | * | * | htt:L0 |

Referring to Table 6, an on-demand scenario is illustrated in which the starting of a connection is triggered by the arrival (outbound or inbound) of an IP packet matching the connection definition filter. The triggering IP packet will be buffered until the connection has started. Also, the number of connections is limited due to the 'f' selector granularity values for source, destination port and protocol and anchor filter.

TABLE 6 connection def name = ted,
initialization = external, roles = gw to gw.

| event | | src ip | dest ip | src port | dest port | proto | connect |
|---|---|---|---|---|---|---|---|
| anchor filter | | a.b.c.* | x.y.*.* | <1024 | <1024 | * | |
| selector granularity | | s | s | f | f | s | |
| client pair 1 | | (none allowed) | | | | | |
| after ifc | 0 | a.b.c.* | x.y.*.* | <1024 | <1024 | * | ted:L0 |
| start | i | x.y.*.* | a.b.c.* | <1024 | <1024 | * | ted:L0 |

TABLE 6-continued connection def name = ted,
initialization = external, roles = gw to gw.

| event | | src ip | dest ip | src port | dest port | proto | connect |
|---|---|---|---|---|---|---|---|
| after conn start | 0 | a.b.c.89 | x.y.102.221 | <1024 | <1024 | tcp | |
| ted:L1428 | 0 | a.b.c.* | x.y.*.* | <1024 | <1024 | * | ted:L0 |
| | i | x.y.102.221 | a.b.c.89 | <1024 | <1024 | tcp | |
| ted:L1428 | i | x.y.*.* | a.b.c.* | <1024 | <1024 | * | ted:L0 |

Referring to Table 7, illustrating first order collision detection, the possible state of selectors for an existing filter rule and some possible new filter rules are shown. Traffic that matches 'new A' will also match 'existing'. If 'existing' is specified by a subnet mask (255.255.255.0 in this example) then A should be placed before existing. For 'new B', however, the situation is ambiguous—an IP datagram that matches B might also match 'existing'. Hence there is no naturally 'right' place for B relative to existing. If placed before, some traffic which should be handled by 'existing' will be handled by B, and if B is placed after, it might get traffic which 'existing' should get. This is a filter collision, and hence the load of the connection for which B is the connection filter will be denied. New rule C also matches a subset of IP datagrams that 'existing' matches (as A did), but the subsetting is not based on an IP address subnet mask, rather C's more specific values for ports and protocol Rule C could be placed before 'existing' as for A. But, consider the situation if A had just been placed before 'existing'. Where is the natural place for C? Due to the ambiguity of this, the connection associated with C will also be denied to start, and under the preferred embodiment only rules which are more specific based on subnet masking will be automatically placed.

TABLE 7

EXAMPLES OF FIRST ORDER COLLISION DETECTION

| | src ip | dest ip | src port | dest port | protocol |
|---|---|---|---|---|---|
| existing | * | a.b.c.* | * | * | * |
| new A | * | a.b.c.14 | * | * | * |
| new B | q.w.e.* | * | * | * | * |
| new C | * | a.b.c.* | >1023 | >1023 | tcp |

Referring to Table 8, second order collision is illustrated. Here, the problem is deeper, because it depends on the exact way the selectors are specified. This table represents second order collision problems—the collision cannot be detected merely by examining the general form of each pair of selectors.

TABLE 8

SECOND ORDER COLLISION EXAMPLES

| | src ip | dest ip | src port | dest port | protocol |
|---|---|---|---|---|---|
| existing | * | a.b.c.* | * | * | * |
| new A | * | a.b.c.14,a.b.d.2 | * | * | * |
| new B | * | ! = a.b.c.204 | * | * | * |
| new C | * | a.b.c.251 to a.b.d.11 | * | * | * |

In Table 8, for A, each value specified for dest ip must be checked for collision with 'existing'. In this case, A is ambiguous due to the a.b.d.2 address. For B, it matches a superset of IP datagrams matched by A, not based on subnet masking, so is also a collision with 'existing'. Filter rule C matches a range of IP address which overlaps 'existing', hence is also a collision.

Second order collision detection is invoked whenever a pair of rules has other than '*' specified. The analysis of second order collisions depends upon the operator used in the filter rule, which for IP addresses may be '=' or '!=' and the multiplicity of addresses, which may be one of single, range, subnet masked, set (arbitrary multiple, non-contiguous)

Referring to Table 9, second order collision detection is shown for IP addresses. A similar table, Table 10, with different operators and multiplicity values, shows second order detection for ports.

TABLE 9

IP ADDRESS SECOND ORDER COLLISION CHECKING

| existing rule | new rule | | | | | | | |
|---|---|---|---|---|---|---|---|---|
| | =, 1 | < >, 1 | =, n | < >, n | =, mask | < >, mask | =, 1–2 | < >, 1–2 |
| =, 1 | = | < > | any= | all< > | in subnet | mask< > | ????? | not in 1–2 |
| < >, 1 | < > | = | c | c | c | c | c | c |
| =, n | =any | c | =any | < >any | any in subnet | any not in subnet | a<=any <=b | any<1 or any>2 |

TABLE 9-continued

IP ADDRESS SECOND ORDER COLLISION CHECKING

| existing rule | new rule | | | | | | | |
|---|---|---|---|---|---|---|---|---|
| | =, 1 | < >, 1 | =, n | < >, n | =, mask | < >, mask | =, 1–2 | < >, 1–2 |
| < >, n =, mask | < >all in sub net | c c | < >any any in subnet | =any c | c subnets equal | c subnets < > | c 1–2 in subnet | c 1–2 equ subnet |
| < >, mask | mask < > | c | any not in subnet | c | subnets < > | mask= | 1–2 not in subnet | c |
| =, a–b | in a–b | c | a<= any <=b | c | a–b in subnet | a–b not in subnet | any overlap | 1–2< > a–b |
| < >, a–b | not in a–b | c | any<a or any >b | c | a–b equ subnet | c | 1–2< > a–b | 1<a or 2>b |

In Table 9, testing for IP address collision depends on the specific operator and value set for the two tuples being compared. The rows represent an existing rule, the columns are for the new rule. If the test in a cell succeeds, there is a collision. 'c' means collision inherent, no further test necessary. This table is for the general case represented by current FILTER statement syntax. For connection filters, since they are derived from user-client-pair or IDci and IDcr from responder-mode connections, only a subset of this table applies. The applicable subset is indicated by bold italics. During resolution (load) of tuples, the index value of the function is retained.

In accordance with the preferred embodiment, the collision of two masked IP addresses is handled, and only the case of identical subnets is denied due to collision. The superset and subset cases are both handled by placing the rules in their natural order, with the smaller subnet in front of the larger(a special case exception to avoiding collisions).

Referring to Table 10, second order checks for port number are illustrated. This table is symmetric about the diagonal, like the IP address table, Table 9. Multiplicity is always 1, so the table is defined solely on the basis of the operator. Again, Table 10 shows the general case based on FILTER statement syntax, with bold italics subsets specific to connection filters, and 'c' means 'collision'.

TABLE 10

SECOND ORDER PORT COLLISION CHECKS

| existing rule | new rule | | | | | |
|---|---|---|---|---|---|---|
| | =b | < >b | <b | >b | <=b | >=b |
| < >a | a< >b | c | c | c | c | c |
| <a | a>=b | c | c | a>b | c | a<=b |
| >a | a<=b | c | a<b | c | a<=b | c |
| <=a | a>b | c | c | a>=b | c | a=b |
| >=a | a<b | c | a<=b | c | a=b | c |

The syntax of a FILTER statement is set forth in Table 11, in which upper case words are keywords; { } brackets denote a set of possible parameter values, one of which is allowed; [ ] brackets denote optional parameters; < > brackets denote parameter group, one parameter of which must be chosen; * is a 'keyword value'; 'number n-m' means number in range n to m (inclusive); each parameter is shown on separate line for convenience; and non-optional parameters are expected in the order shown while optional parameters may appear in any order. (The preferred embodiment of the invention covers the entire table, even though the IP Sec architecture does not require all these possibilities.)

TABLE 11

FILTER STATEMENT

```
FILTER  SET set_name
        ACTION={PERMINT,DENY,IPSEC}
        DIRECTION={INBOUND,OUTBOUND,*}
        SRCADDR{=,<>} {ipaddr,address_name1,*}
        DSTADDR{=,<>} {IPADDR,ADDRESS_NAME2,*}
        <SERVICE=service_name
            PROTOCOL =
                {TCP,TCP/STARTING,UDP,ESP,AH,
                number 0-255,*}
                DSTPORT{=,<>,<,>,<=,>=} {number 1-
                65535,*}
                SRCPORT{=,<>,<,>,<=,>=} {number 1-
                65535,*}
            PROTOCOL =  ICMP_TYPE{=,<>,<,>,<=,>=}
                {typevalue,*}
                    CODE
                {=,<>,<,>,<=,>=} {codevalue,*}
        >
        [FRAGMENTS={NONE,HEADERS,*}]
        [CONNECTION_DEFINITION=
        {connectiondef_name,DYNAMICIP}]
        [QOSLEVEL=number 0-16}]
        [JRN={FULL,OFF}]
        [ON-DEMAND={OFF,ON}]
```

In accordance with the preferred embodiment of the invention, a new IPSEC action allows specification of anchor filters. When IPSEC is used, the CONNECTION_DEFININITION parameter must be supplied. If IPSEC is action, then DIRECTION must be OUTBOUND. If IPSEC is action, then protocol may not be icmp or tcp/starting. The new constants for PROTOCOL simplify writing IPsec filters. Each connectiondef_name must be unique across all the filter rules loaded for a given physical interface (each connection group may be loaded 0 or 1 times per physical interface). The reserved name DYNAMICIP is used in the anchor filter for IPsec connections whose remote IP address is not known ahead of time; mobile workers, remote branch offices with IP's assigned by their ISP (all responder-mode). Connections are started for these systems based on IDcr from IKE, which in turn will use the deferred selectors in the VPN policy database.

Key functional elements of the preferred embodiment of the invention are:
 1. Verification that connection filter is within policy filter (Table 12).
 2. Detection of first-order collision (Table 13).
 3. Detection of second-order collision (Table 14).

Tables 12–14, respectively, are pseudo-code (C++-like syntax) descriptions of these functional elements.

TABLE 12

VERIFICATION THAT CONNECTION FILTER IS WITHIN POLICY FILTER

```
// compare new connection filter with policy filter . . .
for ( each selector type ) {
    if ( selector is IP addr ) {
        switch {policy selector op, new selector op} combination ) {
            // for each possible combination of selectors,
            // make appropriate comparison between policy value
            // and new value.
            if ( new value is not within policy value ) return fail;
        } // switch
    }
    else { // selector is protocol or port
        if ( new value != policy value ) return fail;
    }
} // for( )
return ok;
```

TABLE 13

DETECTION OF FIRST-ORDER COLLISION

```
// compare selectors on existing connection filters with
// selectors on new connection filter . . .
for ( each existing connection filter with set for connection group ) {
    for (each type of selector ) {
        if ( (existingfilter.hasSelector(type) &&
            !newfilter.hasSelector(type) )   ||
            (!existingfilter.hasSelector(type) &&
            newfilter.hasSelector(type))     return fail;
    }
}
return ok;
```

TABLE 14

DETECTION OF SECOND-ORDER COLLISION

```
// compare new connection filter with existing connection filters . . .
for ( each existing connection filter ) {
    for ( each selector type )    {
        if ( selector is IP addr )    {
            switch ( (existing selector op, new selector op)
                combination {
                // for each possible combination of selectors,
                // make appropriate comparison between policy value
                // and new value.
                if (new value is within existing value) return fail;
            } // switch
        }
        else { // selector is protocol or port
            if ( new value == existing value ) return fail;
        }
    }
} // for( )
return ok;
```

Advantages Over the Prior Art

It is an advantage of the invention there is provided an improved system and method for managing a set of filter rules.

It is a further advantage of the invention there is provided a system and method for dynamically loading individual connection filters in a preexisting set of policy filters.

It is a further advantage of the invention there is provided micro placement of connection filters.

It is a further advantage of the invention that there is provided a system and method providing deterministic and unambiguous VPN connections, in a completely automated manner, that meet the customer-specified data protection policy.

It is a further advantage of the invention that there is provided a system and method of providing automated assurance that all VPN connections for a given data protection policy, actually cause data to be protected as per the policy.

Alternative Embodiments

It will be appreciated that, although specific embodiments of the invention have been described herein for purposes of illustration, various modifications may be made without departing from the spirit and scope of the invention. In particular, it is within the scope of the invention to provide a program storage or memory device such as a solid or fluid transmission medium, magnetic or optical wire, tape or disc, or the like, for storing signals readable by a machine for controlling the operation of a computer according to the method of the invention and/or to structure its components in accordance with the system of the invention.

Accordingly, the scope of protection of this invention is limited only by the following claims and their equivalents.

I claim:

1. A method for dynamically placing a connection filter within a set of filters, comprising the steps of:

initializing a filter set to include a policy filter;

matching said connection filter sequentially against filters within said set of filters;

responsive to finding a match of said connection filter with a matching policy filter, determining if at least one other connection filter corresponds to said matching policy filter, and if so, determining if there is collision with said other connection filter;

if there is no collision with said other connection filter, placing said connection filter in said set of filters before said matching policy filter; and if there is collision, rejecting said connection filter.

2. The method of claim 1, wherein the step of determining collision comprises the step of:

determining if IP traffic will be routed differently depending upon the order within said set of filters of said connection filter and said other connection filter.

3. The method of claim 1, wherein the step of determining collision comprises the step of determining if there exists selector overlap between said connection filter and said other connection filter.

4. The method of claim 3, wherein said selectors comprise source ip address, destination ip address, source port, destination port, and protocol.

5. A system for dynamically placing a connection filter within a set of filters, comprising:

a first program code module for initializing a filter set to include a policy filter;

a second program code module for matching said connection filter sequentially against filters within said set of filters;

a third program code module responsive to finding a match of said connection filter with a matching policy filter for determining if at least one other connection filter corresponds to said matching policy filter, and if so, determining if there is collision with said other connection filter;

a fourth program code module responsive if there is no collision with said other connection filter for placing, said connection filter in said set of filters before said matching policy filter; and if there is collision, rejecting said connection filter.

6. The system of claim 5, wherein said third program code module further comprises:

a fifth program code module for determining if IP traffic will be routed differently depending upon the order within said set of filters of said connection filter and said other connection filter.

7. The system of claim 5, wherein said third program code module further comprises:

a sixth program code module for determining if there exists selector overlap between said connection filter and said other connection filter.

8. The system of claim 7 wherein said selectors comprise source ip address, destination ip address, source port, destination port, and protocol.

9. A system for dynamically placing a connection filter within a set of filters, comprising:

means for initializing a filter set to include a policy filter;

means for matching said connection filter sequentially against filters within said set of filters;

means responsive to finding a match of said connection filter with a matching policy filter for determining if at least one other connection filter corresponds to said matching policy filter, and if so, determining if there is collision with said other connection filter;

means responsive if there is no collision with said other connection filter for placing said connection filter in said set of filters before said matching policy filter; and if there is collision, for rejecting said connection filter.

10. The system of claim 9, wherein collision is determined if IP traffic will be routed differently depending upon the order within said set of filters of said connection filter and said other connection filter.

11. The system of claim 9, wherein collision is determined if there exists selector overlap between said connection filter and said other connection filter.

12. The system of claim 11 wherein said selectors comprise source ip address, destination ip address, source port, destination port, and protocol.

13. A program storage device readable by a machine, tangibly embodying a program of instructions executable by a machine to perform method steps for dynamically placing a connection filter within a set of filters , said method steps comprising:

initializing a filter set to include a policy filter;

matching said connection filter sequentially against filters within said set of filters;

responsive to finding a match of said connection filter with a matching policy filter, determining if at least one other connection filter corresponds to said matching policy filter, and if so, determining if there is collision with said other connection filter;

if there is no collision with said other connection filter, placing said connection filter in said set of filters before said matching policy filter; and if there is collision, rejecting said connection filter.

14. An article of manufacture comprising:

a computer useable medium having computer readable program code means embodied therein for dynamically placing a connection filter within a set of filters, the computer readable program means in said article of manufacture comprising:

computer readable program code means for causing a computer to effect initializing a filter set to include a policy filter;

computer readable program code means for causing a computer to effect matching said connection filter sequentially against filters within said set of filters;

computer readable program code means for causing a computer to effect responsive to finding a match of said connection filter with a matching policy filter, determining if at least one other connection filter corresponds to said matching policy filter, and if so, determining if there is collision with said other connection filter;

computer readable program code means for causing a computer to effect, if there is no collision with said other connection filter, placing said connection filter in said set of filters before said matching policy filter; and if there is collision, rejecting said connection filter.

* * * * *